(12) United States Patent
Karaoguz et al.

(10) Patent No.: US 9,081,422 B2
(45) Date of Patent: Jul. 14, 2015

(54) SYSTEM AND METHOD IN A TELEVISION CONTROLLER FOR PROVIDING USER-SELECTION OF OBJECTS IN A TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 388 days.

(21) Appl. No.: 12/850,945

(22) Filed: Aug. 5, 2010

(65) Prior Publication Data

US 2011/0063523 A1  Mar. 17, 2011

Related U.S. Application Data

(60) Provisional application No. 61/242,234, filed on Sep. 14, 2009.

(51) Int. Cl.
*H04N 7/173* (2011.01)
*H04N 5/445* (2011.01)
*G06F 3/0346* (2013.01)
(Continued)

(52) U.S. Cl.
CPC ............ *G06F 3/0346* (2013.01); *G06F 3/0304* (2013.01); *G06F 3/0325* (2013.01); *G06F 3/0386* (2013.01); *G06F 3/0428* (2013.01); *H04N 5/445* (2013.01); *H04N 21/23892* (2013.01); *H04N 21/234318* (2013.01); *H04N 21/2408* (2013.01); *H04N 21/25841* (2013.01); *H04N 21/2668* (2013.01); *H04N 21/42204* (2013.01); *H04N 21/436* (2013.01); *H04N 21/438* (2013.01); *H04N 21/4325* (2013.01); *H04N 21/4334* (2013.01); *H04N 21/4524* (2013.01); *H04N 21/472* (2013.01); *H04N 21/4725* (2013.01); *H04N 21/4728* (2013.01); *H04N 21/4826* (2013.01); *H04N 21/812* (2013.01); *H04N 21/845* (2013.01); *H04N 21/858* (2013.01); *H04N 21/8545* (2013.01); *H04N 5/76* (2013.01); *H04N 9/8205* (2013.01);
(Continued)

(58) Field of Classification Search
USPC ............... 725/38, 112, 113, 63, 64; 715/204; 718/204; 348/801, 734
See application file for complete search history.

(56) References Cited

U.S. PATENT DOCUMENTS 5,111,511 A  5/1992  Ishii et al.
5,408,258 A  4/1995  Kolessar
(Continued)

FOREIGN PATENT DOCUMENTS

CN  1193869 A  9/1998
CN  1300501 A  6/2001
(Continued)

OTHER PUBLICATIONS

Office Action from related U.S. Appl. No. 12/774,154 dated Dec. 5, 2012.
(Continued)

*Primary Examiner* — Pankaj Kumar
*Assistant Examiner* — Reuben M Brown
(74) *Attorney, Agent, or Firm* — Brinks Gilson & Lione

(57) ABSTRACT

A system and method in a television controller for providing user-selection of objects in a television program, substantially as shown in and/or described in connection with at least one of the figures, as set forth more completely in the claims.

28 Claims, 5 Drawing Sheets

(51) Int. Cl.

| | |
|---|---|
| *G06F 3/03* | (2006.01) |
| *G06F 3/042* | (2006.01) |
| *H04N 21/2343* | (2011.01) |
| *H04N 21/2389* | (2011.01) |
| *H04N 21/422* | (2011.01) |
| *H04N 21/432* | (2011.01) |
| *H04N 21/433* | (2011.01) |
| *H04N 21/4725* | (2011.01) |
| *H04N 21/4728* | (2011.01) |
| *H04N 21/845* | (2011.01) |
| *G06F 3/038* | (2013.01) |
| *H04N 21/482* | (2011.01) |
| *H04N 21/436* | (2011.01) |
| *H04N 21/258* | (2011.01) |
| *H04N 21/45* | (2011.01) |
| *H04N 21/2668* | (2011.01) |
| *H04N 21/472* | (2011.01) |
| *H04N 21/8545* | (2011.01) |
| *H04N 21/858* | (2011.01) |
| *H04N 21/24* | (2011.01) |
| *H04N 21/438* | (2011.01) |
| *H04N 21/81* | (2011.01) |
| *H04N 5/44* | (2011.01) |
| *H04N 7/16* | (2011.01) |
| *H04N 5/76* | (2006.01) |
| *H04N 9/82* | (2006.01) |

(52) U.S. Cl.
CPC *H04N 2005/4428* (2013.01); *H04N 2005/4432* (2013.01)

(56) References Cited

U.S. PATENT DOCUMENTS

| | | | |
|---|---|---|---|
| 5,543,851 A | 8/1996 | Chang | |
| 5,602,568 A | 2/1997 | Kim | |
| 5,708,845 A * | 1/1998 | Wistendahl et al. | 715/202 |
| 5,718,845 A | 2/1998 | Drost | |
| 5,721,584 A * | 2/1998 | Yoshinobu et al. | 725/114 |
| 5,727,141 A | 3/1998 | Hoddie | |
| 5,793,361 A | 8/1998 | Kahn et al. | |
| 5,929,849 A | 7/1999 | Kikinis | |
| 6,097,441 A | 8/2000 | Allport | |
| 6,122,660 A | 9/2000 | Baransky et al. | |
| 6,133,911 A | 10/2000 | Kim | |
| 6,255,961 B1 * | 7/2001 | Van Ryzin et al. | 340/3.1 |
| 6,314,569 B1 | 11/2001 | Chernock et al. | |
| 6,317,714 B1 * | 11/2001 | Del Castillo et al. | 704/270 |
| 6,349,410 B1 | 2/2002 | Lortz | |
| 6,407,779 B1 * | 6/2002 | Herz | 348/734 |
| 6,538,672 B1 | 3/2003 | Dobbelaar | |
| 6,567,984 B1 | 5/2003 | Allport | |
| 6,931,660 B1 | 8/2005 | Kalluri et al. | |
| 7,053,965 B1 * | 5/2006 | Fan | 348/734 |
| 7,057,670 B2 | 6/2006 | Kikinis | |
| 7,102,616 B1 | 9/2006 | Sleator | |
| 7,301,530 B2 | 11/2007 | Lee et al. | |
| 7,344,084 B2 | 3/2008 | DaCosta | |
| 7,360,232 B2 * | 4/2008 | Mitchell | 725/112 |
| 7,409,437 B2 | 8/2008 | Ullman et al. | |
| 7,535,456 B2 | 5/2009 | Liberty | |
| 7,536,706 B1 | 5/2009 | Sezan | |
| 7,612,748 B2 * | 11/2009 | Tateuchi | 345/81 |
| 7,631,338 B2 | 12/2009 | Del Sesto et al. | |
| 7,805,747 B2 | 9/2010 | Klappert | |
| 7,889,175 B2 | 2/2011 | Kryze et al. | |
| 7,890,380 B2 | 2/2011 | Stefanik | |
| 7,987,478 B2 | 7/2011 | Minor | |
| 8,095,423 B2 | 1/2012 | Nichols | |
| 8,181,212 B2 | 5/2012 | Sigal | |
| 8,223,136 B2 | 7/2012 | Hu et al. | |
| 8,269,746 B2 | 9/2012 | Hodges et al. | |
| 8,359,628 B2 * | 1/2013 | Kitaru et al. | 725/153 |
| 8,421,746 B2 | 4/2013 | Igoe | |
| 8,608,535 B2 | 12/2013 | Weston | |
| 2001/0019368 A1 * | 9/2001 | Holme et al. | 348/734 |
| 2001/0023436 A1 | 9/2001 | Srinivasan | |
| 2001/0047298 A1 | 11/2001 | Moore | |
| 2002/0040482 A1 | 4/2002 | Sextro | |
| 2002/0042925 A1 | 4/2002 | Ebisu | |
| 2002/0056136 A1 | 5/2002 | Wistendahl | |
| 2002/0069405 A1 | 6/2002 | Chapin et al. | |
| 2002/0078446 A1 | 6/2002 | Dakss | |
| 2002/0090114 A1 | 7/2002 | Rhoads | |
| 2002/0120934 A1 | 8/2002 | Abrahams | |
| 2002/0136432 A1 | 9/2002 | Koike et al. | |
| 2002/0162120 A1 | 10/2002 | Mitchell | |
| 2003/0005445 A1 | 1/2003 | Schein | |
| 2003/0023981 A1 | 1/2003 | Lemmons | |
| 2003/0028873 A1 | 2/2003 | Lemmons | |
| 2003/0035075 A1 * | 2/2003 | Butler et al. | 348/734 |
| 2003/0051253 A1 | 3/2003 | Barone, Jr. | |
| 2003/0054878 A1 | 3/2003 | Benoy et al. | |
| 2003/0115602 A1 | 6/2003 | Knee | |
| 2003/0145326 A1 | 7/2003 | Gutta et al. | |
| 2003/0212996 A1 | 11/2003 | Wolzien | |
| 2003/0217360 A1 | 11/2003 | Gordon et al. | |
| 2003/0236752 A1 | 12/2003 | Dawson et al. | |
| 2004/0078814 A1 | 4/2004 | Allen | |
| 2004/0119701 A1 | 6/2004 | Mulligan et al. | |
| 2004/0221025 A1 | 11/2004 | Johnson et al. | |
| 2004/0236865 A1 | 11/2004 | Ullman | |
| 2004/0268401 A1 | 12/2004 | Gray et al. | |
| 2005/0028208 A1 | 2/2005 | Ellis | |
| 2005/0132420 A1 | 6/2005 | Howard et al. | |
| 2005/0153687 A1 | 7/2005 | Niemenmaa et al. | |
| 2005/0177861 A1 | 8/2005 | Ma et al. | |
| 2005/0193425 A1 | 9/2005 | Sull et al. | |
| 2005/0229227 A1 | 10/2005 | Rogers | |
| 2005/0251835 A1 | 11/2005 | Scott | |
| 2005/0262542 A1 | 11/2005 | DeWeese et al. | |
| 2006/0037044 A1 | 2/2006 | Daniels | |
| 2006/0064734 A1 | 3/2006 | Ma | |
| 2006/0099964 A1 | 5/2006 | Barrese et al. | |
| 2006/0152489 A1 | 7/2006 | Sweetser et al. | |
| 2006/0174273 A1 | 8/2006 | Park | |
| 2006/0241864 A1 | 10/2006 | Rosenberg | |
| 2006/0282847 A1 | 12/2006 | Gupte | |
| 2007/0097275 A1 | 5/2007 | Dresti et al. | |
| 2007/0130581 A1 | 6/2007 | Del Sesto et al. | |
| 2007/0137611 A1 | 6/2007 | Contin et al. | |
| 2007/0157260 A1 | 7/2007 | Walker | |
| 2007/0195205 A1 | 8/2007 | Lowe | |
| 2007/0199014 A1 | 8/2007 | Clark et al. | |
| 2007/0216814 A1 * | 9/2007 | Azuma | 348/646 |
| 2007/0266406 A1 | 11/2007 | Aravamudan | |
| 2007/0277201 A1 | 11/2007 | Wong | |
| 2007/0300263 A1 | 12/2007 | Barton | |
| 2008/0052750 A1 | 2/2008 | Grunnet-Jepsen | |
| 2008/0066097 A1 | 3/2008 | Park et al. | |
| 2008/0066129 A1 | 3/2008 | Katcher et al. | |
| 2008/0089551 A1 | 4/2008 | Heather et al. | |
| 2008/0109851 A1 | 5/2008 | Heather | |
| 2008/0132163 A1 | 6/2008 | Ilan et al. | |
| 2008/0136754 A1 | 6/2008 | Tsuzaki et al. | |
| 2008/0172693 A1 | 7/2008 | Ludvig | |
| 2008/0184132 A1 | 7/2008 | Zato | |
| 2008/0204603 A1 * | 8/2008 | Hattori et al. | 348/699 |
| 2008/0204605 A1 * | 8/2008 | Tsai | 348/734 |
| 2008/0209480 A1 | 8/2008 | Eide | |
| 2009/0021473 A1 | 1/2009 | Grant et al. | |
| 2009/0037947 A1 | 2/2009 | Patil | |
| 2009/0077394 A1 | 3/2009 | Tsai et al. | |
| 2009/0083815 A1 | 3/2009 | McMaster et al. | |
| 2009/0113475 A1 | 4/2009 | Li | |
| 2009/0165041 A1 | 6/2009 | Penberthy et al. | |
| 2009/0165048 A1 | 6/2009 | Nishimura | |
| 2009/0187862 A1 | 7/2009 | DaCosta | |
| 2009/0199259 A1 | 8/2009 | Alao et al. | |
| 2009/0217317 A1 | 8/2009 | White | |

(56) References Cited

U.S. PATENT DOCUMENTS

| | | | |
|---|---|---|---|
| 2009/0235312 A1 | 9/2009 | Morad | |
| 2009/0237572 A1* | 9/2009 | Kishimoto | 348/734 |
| 2009/0256811 A1 | 10/2009 | Pasquariello | |
| 2009/0296686 A1 | 12/2009 | Pirani et al. | |
| 2010/0097348 A1 | 4/2010 | Park | |
| 2010/0098074 A1 | 4/2010 | Kokemak | |
| 2010/0157152 A1 | 6/2010 | Weitbruch et al. | |
| 2010/0162303 A1 | 6/2010 | Cassanova | |
| 2011/0043709 A1* | 2/2011 | Hirata et al. | 348/734 |
| 2011/0063523 A1* | 3/2011 | Karaoguz et al. | 348/734 |
| 2011/0066929 A1 | 3/2011 | Karaoguz et al. | |
| 2011/0067062 A1 | 3/2011 | Karaoguz et al. | |
| 2011/0067063 A1 | 3/2011 | Karaoguz et al. | |
| 2011/0067064 A1 | 3/2011 | Karaoguz et al. | |
| 2011/0067069 A1 | 3/2011 | Karaoguz et al. | |
| 2011/0141013 A1 | 6/2011 | Matthews | |
| 2011/0179435 A1 | 7/2011 | Cordray | |
| 2011/0211131 A1* | 9/2011 | Kikuchi et al. | 348/734 |
| 2012/0079525 A1 | 3/2012 | Ellis | |
| 2012/0154268 A1* | 6/2012 | Alten | 345/156 |
| 2012/0163776 A1 | 6/2012 | Hassell et al. | |
| 2014/0101690 A1 | 4/2014 | Boncyk et al. | |

FOREIGN PATENT DOCUMENTS

| | | |
|---|---|---|
| CN | 1329796 A | 1/2002 |
| WO | WO 99/04559 A1 | 1/1999 |
| WO | WO 2007/137611 | 12/2007 |
| WO | WO 2009/033500 A1 | 3/2009 |

OTHER PUBLICATIONS

Final Office Action from related U.S. Appl. No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl. No. 12/880,888 dated Dec. 6, 2012.
Office Action from related U.S. Appl. No. 12/774,380 dated Jan. 8, 2013.
Final Office Action from related U.S. Appl. No. 12/880,965 dated Jan. 11, 2013.
Office Action from related U.S. Appl. No. 12/880,530 dated Aug. 2, 2012.
Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012,.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/880,965 dated Jun. 25, 2012.
Office Action from related U.S. Appl. No. 12/881,004 dated Nov. 1, 2012.
Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Office Action from related U.S. Appl. No. 12/850,866 dated Oct. 4, 2012,.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Final Office Action from related U.S. Appl No. 12/774,154 dated Apr. 10, 2013.
Final Office Action from related U.S. Appl No. 12/881,004 dated Mar. 7, 2013.
Final Office Action from related U.S. Appl No. 12/851,036 dated Feb. 26, 2013.
Final Office Action from related U.S. Appl No. 12/851,075 dated Mar. 5, 2013.
Non-Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/774,321 dated Jun. 27, 2013.
Non-Final Office Action from related U.S. Appl. No. 12/774,154 dated Aug. 14, 2013.
Non-Final Office Action from related U.S. Appl. No. 12/880,668 dated Jun. 10, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Final Office Action from related U.S. Appl. No. 12/774,154 dated Feb. 27, 2014.
Final Office Action from related U.S. Appl. No. 12/881,031 dated Mar. 6, 2014.
Final Office Action from related U.S. Appl. No. 12/880,749 dated Mar. 13, 2014.
Final Office Action from related U.S. Appl. No. 12/774,221 dated Jan. 29, 2014.
Final Office Action from related U.S. Appl. No. 12/880,851 dated Feb. 12, 2014.
Non-Final Office Action from related U.S. Appl. No. 12/774,321 dated Feb. 7, 2014.
Non-Final Office Action from related U.S. Appl. No. 12/850,832 dated Mar. 24, 2014.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/880,530 dated Apr. 9, 2014.

(56) References Cited

OTHER PUBLICATIONS

Non-Final Office Action from related U.S. Appl. No. 12/774,380 dated Apr. 15, 2014.
Non-Final Office Action from related U.S. Appl. No. 12/881,067 dated May 9, 2014.
Final Office Action from related U.S. Appl. No. 12/774,321 dated Jun. 2, 2014.
Intel, "Intel Ethernet Switch Converged Enhanced Ethernet (CEE) and Datacenter Bridging (DCB)", White Paper, Feb. 2009, pp. 1-14.
Non-Final Office Action from related U.S. Appl. No. 12/881,110 dated Sep. 17, 2014.
Non-Final Office Action from related U.S. Appl. No. 12/881,096 dated Sep. 22, 2014.
Final Office Action from related U.S. Appl. No. 12/851,075 dated Oct. 14, 2014.
Final Office Action from related U.S. Appl. No. 12/850,832 dated Oct. 7, 2014.
Non-Final Office Action from related U.S. Appl. No. 12/880,965 dated Sep. 30, 2014.
Non-Final Office Action from related U.S. Appl. No. 14/457,451 dated Nov. 20, 2014.
Non-Final Office Action from related U.S. Appl. No. 12/774,154 dated Nov. 13, 2014.
Final Office Action from related U.S. Appl. No. 12/880,749 dated Jan. 13, 2015.
Non-Final Office Action from related U.S. Appl. No. 12/774,221 dated Jan. 28, 2015.
Non-Final Office Action from related U.S. Appl. No. 14/488,778 dated Jan. 2, 2015.
Non-Final Office Action from related U.S. Appl. No. 14/480,020 dated Dec. 31, 2014.
Non-Final Office Action from related U.S. Appl. No. 14/479,670 dated Dec. 19, 2014.
Final Office Action from related U.S. Appl. No. 12/881,031 dated Feb. 12, 2015.
Final Office Action from related U.S. Appl. No. 12/881,110 dated Feb. 18, 2015.
Non-Final Office Action from related U.S. Appl. No. 14/467,408 dated Dec. 17, 2014.

\* cited by examiner

SYSTEM AND METHOD IN A TELEVISION CONTROLLER FOR PROVIDING USER-SELECTION OF OBJECTS IN A TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/774,380, filed May 5, 2010, titled "SYSTEM AND METHOD IN A TELEVISION FOR PROVIDING USER-SELECTION OF OBJECTS IN A TELEVISION PROGRAM"; U.S. patent application Ser. No. 12/850,832, filed concurrently herewith, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed concurrently herewith, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed concurrently herewith, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,036, filed concurrently herewith, titled "SYSTEM AND METHOD IN A TELEVISION SYSTEM FOR PROVIDING FOR USER-SELECTION OF AN OBJECT IN A TELEVISION PROGRAM"; U.S. patent application Ser. No. 12/851,075, filed concurrently herewith, titled "SYSTEM AND METHOD IN A PARALLEL TELEVISION SYSTEM FOR PROVIDING USER-SELECTION OF OBJECTS IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of providing for and/or conveniently providing for user-selection of objects in a television program. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a television controller (e.g., a device with television remote control capability) for providing for user selection of objects in a television program, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
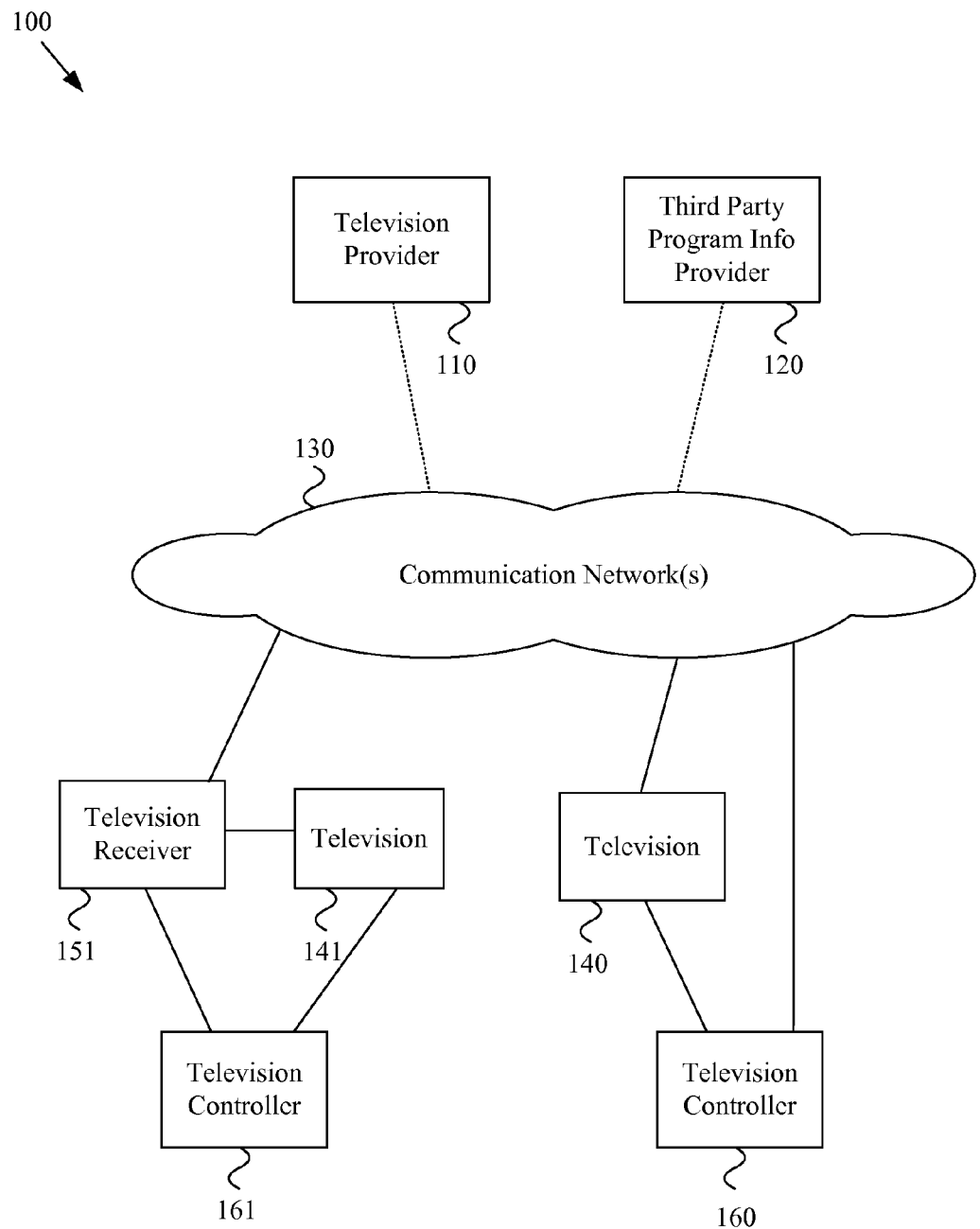
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or hardware/software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television controller modules). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion will at times refer to an on-screen pointing location. Such a pointing location refers to a location on the television screen to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television controller (e.g., a television remote control device, a personal electronic device with television controlling capability, etc.), comprise determining an on-screen pointing location pointed to by a user of the television and/or television controller, identifying a user-selected object in presented television programming, and providing user feedback regarding the on-screen pointing location and/or user-selected object.

Also, the following discussion will at times refer to user-selectable objects in television programming. Such user-selectable objects includes both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., clothing, automobiles, shoes, jewelry, furniture, food, beverages, appliances, electronics, toys, artwork, cosmetics, recreational vehicles, sports equipment, safety equipment, computer equipment, communication devices, books, etc.), premises objects (e.g., business locations, stores, hotels, signs, doors, buildings, landmarks, historical sites, entertainment venues, hospitals, government buildings, etc.), objects related to services (e.g., objects related to transportation, objects related to emergency services, objects related to general government services, objects related to entertainment services, objects related to food and/or drink services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reports, analysts, hosts/hostesses, entertainers, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in television programming, etc.).

The exemplary television system 100 may also include a third party program information provider 120. Such a provider 120 may, for example, provide information related to a television program. Such information may, for example, comprise information describing selectable objects in programming, program guide information, etc.

The exemplary television system 100 may include one or more communication networks (e.g., the communication network(s) 130). The exemplary communication network 130 may comprise characteristics of any of a variety of types of communication networks over which television programming and/or information related to television programming (e.g., information identifying and/or describing and/or otherwise related to user-selectable objects in television programming) may be communicated. For example and without limitation, the communication network 130 may comprise characteristics of any one or more of: a cable television network, a satellite television network, a telecommunication network, a general data network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.).

The exemplary television system 100 may include a first television controller 160. Such a first television controller 160 may, for example, operate to (e.g., which may include "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, any personal electronic device with television control capability, etc.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing and/or object identification information with the first television 140 and/or other devices. The first television controller 160 may, for example, operate to (which includes "operate when enabled to") perform any or all of the functionality discussed herein. As a non-limiting example, which will be discussed on more detail below, the first television controller 160 may operate to receive emissions from the first television 140 (e.g., light emissions, wireless RF emissions, etc.), where such emissions correspond to user-selectable objects in television programming.

Also, as will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

The exemplary television system 100 may also include a television receiver 151. The television receiver 151 may, for example, operate to (e.g., which may include "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.).

The exemplary television system 100 may include a second television controller 161. Such a second television controller 161 may, for example, operate to (e.g., which may include "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, any personal electronic device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.). The second television controller 161 may further, for example, operate to receive signals from the second television 141 and/or television receiver 151. Such signals may, for example, comprise signals communicating television programming, information identifying and/or describing user-selectable objects in television programming and/or any of a variety of other information to the second television controller 161. As a non-limiting example, which will be discussed on more detail below, the second television controller 161 may operate to receive emissions from the second television 141 (e.g., light emissions, wireless RF emissions, etc.), where such emissions correspond to user-selectable objects in television programming. The second television controller 161 may, for example, operate to (which includes "operate when enabled to") perform any or all of the functionality discussed herein.

As will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
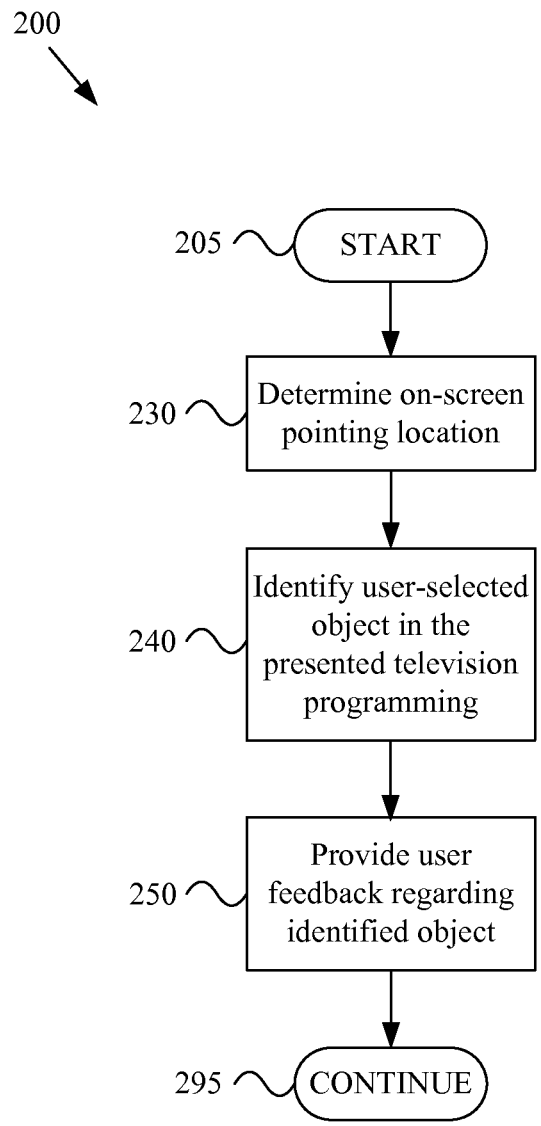
FIG. 2 is a flow diagram illustrating an exemplary method for providing user-selection of objects in television programming, in accordance with various aspects of the present invention.

FIG. 2 is a flow diagram illustrating an exemplary method 200 for providing user-selection of objects in television programming, in accordance with various aspects of the present invention. Any or all aspects of the exemplary method 200 may, for example, be implemented in a television controller, for example the first television controller 160 and/or second television controller 161 shown in FIG. 1 and discussed previously.

The exemplary method 200 may, for example, begin executing at step 205. The exemplary method 200 may begin executing in response to any of a variety of causes and/or conditions. For example, the exemplary method 200 may begin executing in response to a user command to begin, in response to user selection of a television program (or corresponding television channel) that includes user selectable objects, upon television controller reset and/or power-up, in response to a user input indicating a desire to provide object selection capability to the user, in response to identification of a user and/or user equipment for which object selection capability is to be provided, in response to user payment of a fee, in response to user execution of a software application, in response to detecting movement of a television controller, in response to determining that a television controller is being pointed at or near the television, etc.

Though not illustrated in FIG. 2, various aspects of the present invention may comprise a user's local television system (e.g., a television, television receiver, a television controller, etc.) receiving and/or displaying television programming. Many non-limiting examples of such television programming were provided above (e.g., television programming with user-selectable objects). Such television programming may be received from any of a variety of sources. For example and without limitation, such television programming may be received from a television broadcasting company, from a movie streaming company, from a user (or consumer) video recording device (e.g., internal and/or external to the television receiver), from an Internet television programming provider, etc.

Also, for example, the local television system may receive the television programming via any of a variety of types of communication networks. Such networks may, for example, comprise a wireless television network (e.g., terrestrial and/or satellite) and/or cable television network. Such networks may, for example, comprise any of variety of data communication networks (e.g., the Internet, a local area network, a personal area network, a metropolitan area network, etc.).

Additionally, various components of the television system (e.g., the user's local television system) may communicate television programming and/or other video information to a television (e.g., for presentation to a user on a screen of the television). Such communicating may be performed in any of a variety of manners. For example, such communicating may comprise communicating raw video data and/or decoded video data in one or more data signals, one or more television/display driver signals (e.g., composite and/or component video signals), etc. Also for example, such communicating may comprise communicating the television programming and/or other video information over any of a variety of communication media (e.g., wired, tethered optical, wireless RF, non-tethered optical, etc.). Further for example, such communicating may comprise communicating the television programming to video presentation devices external to the television.

In general, the television system (e.g., one or more components of a user's local television system) may receive, communicate and/or present television programming. The scope of various aspects of the present invention should not be limited by characteristics of any particular television programming, television programming source, television programming network or manner of receiving, communicating and/or presenting television programming unless explicitly claimed.

The communicated television programming may, for example, comprise user-selectable objects in the television programming. Many non-limiting examples of such user-selectable objects were presented above. In general, such user-selectable objects may, for example, comprise animate and/or inanimate objects in television programming that a user may select (e.g., using a pointing device or other user interface by which a user may specify a screen location). Information of such user-selectable objects may be received by a television controller and retained for processing by the television controller and/or communicated to the television (or other local television system component) as part of the television programming or separate from the television programming (e.g., via a data interface separate from a television programming interface).

The exemplary method 200 may, at step 230, comprise determining an on-screen pointing location pointed to by a user of the television receiver and/or television. Step 230 may comprise determining an on-screen pointing location in any of a variety of manners, non-limiting examples of which will now be provided. Various non-limiting examples of on-screen pointing location determining are provided in U.S. Provisional Application No. 61/242,234, which is hereby incorporated herein by reference in its entirety. An on-screen pointing location may, for example, be expressed in a screen-centric coordinate system (e.g., x-y pixel coordinates), a screen independent coordinate system (e.g., based on location within a moving image, where such location is generic to all television screens), a world coordinate and/or universal coordinate system, a video frame-based coordinate system, etc.

Step 230 may, for example, comprise the television controller analyzing sensor information (e.g., associated with sensors on-board and/or off-board the television and/or television controller) to determine user on-screen pointing location. Step 230 may also, for example, comprise the television controller receiving information describing the on-screen pointing location from a device external to the television controller (e.g., the television, a television receiver, a television network device, a user pointing device external to the television controller, etc.).

Step 230 may, for example, comprise identifying a timestamp temporally identifying the instance of a determined on-screen pointing location. Such timestamp may, for example, be obtained by a clock, timestamp embedded in a video stream, timestamp embedded in a stream including object information, timestamp associated with a signal transmitted from a user pointing device, etc. Determination of such a timestamp may, for example, be based on user command (e.g., a user indicating that a selection has occurred) or automatically without a direct indication from the user that a selection has occurred (e.g., the system determining that the user has pointed to an object for at least a particular amount of time), etc. Such timestamp may be utilized, for example, for determining selection of a moving, changing and/or temporally transient object in the television programming. As a non-limiting example, as will be discussed below, such timestamp information may be utilized in conjunction with television emission information to identify a user-selected television programming object.

Additionally, as will also be discussed below, various aspects of the present invention may comprise providing feedback of the determined on-screen pointing location to the user. For example, such feedback may be presented on the television screen (e.g., as a cursor or other graphical feature) and/or may be presented on another display (e.g., a display of the television controller).

For various non-limiting examples of the determination of on-screen pointing location, the reader is referred to U.S. patent application Ser. No. 12/774,154, filed May 5, 2010, titled "SYSTEM AND METHOD FOR GENERATING SCREEN POINTING INFORMATION IN A TELEVISION"; U.S. patent application Ser. No. 12/774,221, filed May 5, 2010, titled "SYSTEM AND METHOD FOR GENERATING TELEVISION SCREEN POINTING INFORMATION USING AN EXTERNAL RECEIVER", and U.S. patent application Ser. No. 12/774,321, filed May 5, 2010, titled "SYSTEM AND METHOD FOR GENERATING SCREEN POINTING INFORMATION IN A TELEVISION CONTROL DEVICE. The contents of each of the above-mentioned applications are hereby incorporated herein by reference in their entirety.

In general, step 230 may comprise determining an on-screen pointing location pointed to by a user of the television controller and/or television. Accordingly, the scope of various aspects of the present invention should not be limited by characteristics of any particular type of on-screen pointing location or any particular manner of determining such an on-screen pointing location unless explicitly claimed.

The exemplary method 200 may, at step 240, comprise identifying a user-selectable object in the television programming (e.g., television programming being presented on a television controllable with the television controller) at which the user is pointing or otherwise indicating (e.g., based at least in part on emissions output by a television and received/processed by a television controller implementing the method 200). Step 240 may comprise performing such identifying in any of a variety of manners, non-limiting examples of which will be provided below.

For example, step 240 may comprise receiving an emission from a television that is presenting television programming on a screen, where the emission corresponds to a user-selectable object in the television programming. For example, a user-selectable object in television programming may be presented to a user by the television on-screen with visible light. Also, the television may emit one or more additional signals associated with the user-selectable object. The television may emit such emission, for example, from the same location on the screen as that occupied by the presented user-selectable object. Such emission may, for example, be imperceptible to a user of the television. Various characteristics of such emissions will be discussed below.

In a non-limiting exemplary scenario, a user may be viewing a sporting event being presented on a screen of the television. The user may, for example, be utilizing a television controller having an on-board camera with a field of view, where the user is pointing the television controller such that the center of the camera's field of view is pointing to a particular player in the sporting event. In such a scenario, the television controller can receive one or more signals emitted from the location on the screen coinciding with the particular player, and process such information to ascertain the player's identify, which may then be presented to the user and which may also be utilized (as explained elsewhere herein) as a basis to perform any of a variety of other functionality.

Such receiving of television emissions may, for example, be performed utilizing sensors (e.g., optical sensors, RF sensors, audio sensors, etc.) and/or a camera (e.g., a still image camera, a moving picture camera, a charge coupled device (CCD) camera, etc.) on-board the television controller implementing the method 200. Alternatively, for example, such receiving may be performed via one or more devices external to the television controller that are communicatively coupled to the television controller (e.g., an external light pen and/or laser pointing with emission receiving and communication capability).

The received television emission may comprise characteristics of any of a variety of different types of emissions (or signals) that may be emitted by a television. For example, such emission may be imperceptible to the user. An imperceptible emission may be utilized to communicate information of one or more user-selectable objects to the television controller while not interfering with the user's television programming viewing experience. Such an imperceptible emission may be imperceptible for any of a variety of reasons, non-limiting examples of which are presented below.

Such imperceptible emission may, for example, be imperceptible due to emission characteristics comprising temporal characteristics that make such emission imperceptible to a user. For example, the television may emit bits and/or symbols (e.g., representing one or more bits) for a time duration that is too short to be perceived by a user, but which may be received, detected and/or analyzed by the television controller. In such a scenario, bits and/or symbols may be transmitted in a serial fashion and/or in parallel (e.g., from different respective on-screen locations on the television screen).

In an exemplary scenario, signals communicating information may be emitted from the television (e.g., from an on-screen location corresponding to a user-selectable object) every Nth frame (or field). For example, a television may operate to transmit a template of user-selectable objects every Nth frame of the corresponding television program. Such a template may, for example, comprise a template of user-selectable objects in the programming presently being presented on the screen of the television, where such template includes information identifying object location, object shape, object identification, functions associated with respective objects, etc. The television may, for example, superimpose such template on the video frame currently being shown on the television screen.

Alternatively for example, in a scenario in which information of selectable objects might not be superimposed on a currently presented video image, the television may operate to transmit such a template between scheduled video frames. Note that the rate at which such template information might be transmitted may be varied. For example, in programming with relatively fast-moving user selectable objects (e.g., a sporting event), information of selectable objects may be emitted by the television at a rate that is relatively faster than the rate at which such object information is transmitted during a sitcom or drama.

Such imperceptible emission may, for example, be imperceptible due to emission characteristics comprising frequency characteristics that make such emission imperceptible to a user. For example, the television may emit bits and/or symbols (e.g., representing one or more bits) utilizing a carrier and/or baseband frequency that is imperceptible to the user.

For example, such television emissions may utilize a light carrier at a light frequency that is outside the visible light spectrum, but yet is detectable by light detectors and/or cameras on-board the television controller (or otherwise communicatively coupled thereto). In such a scenario, the television emission may comprise an invisible light emission communicating object identification information directly from the video image being emitted by the television. For example, the television may superimpose such invisible light emission on the corresponding visible light emission of the user-selectable object in the programming containing such object. In such a scenario, when a user points a television controller (e.g., with directional reception capability) at a user-selectable object being visually presented on the screen of the television, the television controller may receive an invisible emission associated with such user-selectable object from the same location on the screen as the visible object. Such invisible emission may, for example, communicate identification information for the pointed-to object and may also communicate many other types of information associated with such object (e.g., regarding functionality that the user may access regarding such object, regarding information available regarding such object, etc.).

Note that in such an implementation where the television is communicating utilizing both visible and invisible light, the respective energy density (or energy) associated with each type of light may vary. For example, an invisible light emission adapted to be received and processed by sensors of the television controller may be emitted by the television at a low energy density (or energy level) relative to visible light emissions that must be transmitted at a level comfortably perceived by the human eye. Such low energy density may, for example, have safety advantages since such light energy may be generally outside frequencies that would trigger the user's blink reflex.

In an exemplary scenario in which step 240 comprises receiving object information in light emissions from the television, step 240 may comprise utilizing any of a variety of sensors to receive such information. Such sensors may comprise, without limitation, directional light sensors (e.g., photo transistors), charge coupled devices (e.g., CCD cameras), still image and/or moving image cameras with capabilities extending into the invisible light spectrum (e.g., infrared and/or ultraviolet light). In a scenario involving utilization of a camera, the camera may have a field of view, the center of which may coincide with the pointing direction of the television controller. Such a camera may, for example, have an adjustable field of view which may be customized to particular users with different respective pointing styles, abilities and/or preferences.

In an alternative light-related implementation, visible light may be modulated at a frequency that is imperceptible to the user. In such a case, issues surrounding the utilization of invisible light may be avoided. For example, in an exemplary scenario, the visible light that is being emitted from the television to present a user-selectable object to the user may be modulated in a manner (e.g., time-based, frequency-based, code-based, etc.) that is imperceptible to the user. For example, such visible light may be modulated at a frequency that is imperceptible, such visible light may be modulated using frequency, color and/or magnitude variations that are imperceptible to the user, etc.

In another exemplary scenario, the television emission may be a wireless RF emission. For example, a television screen may have (e.g., incorporated directly into the screen or incorporated into a film overlay to the television screen) an array of wireless antennas (and/or antenna elements). In such a configuration, a television screen may comprise an array of antennas, where each antenna corresponds to a pixel and/or group of pixels of the television screen. Such antennas (and/or antenna elements) may, for example, be positioned between television pixels and may also be positioned in front of television pixels (e.g., in a configuration in which such antenna elements are small enough to not significantly impact the quality of the light emitted from the television screen. Such antennas may also, for example, be positioned around the border of the television screen.

In such an exemplary scenario, the television controller may comprise various on-board sensors utilized to receive such wireless RF television emissions. For example, the television controller may comprise a directional antenna (e.g., along a pointing axis of the controller). Such directional antenna may, for example, be a dish-type antenna or may also be a matrix type (e.g., a phased array type) of directional antenna system.

In yet another exemplary scenario, the television emission may be an audio signal (e.g., utilizing audio frequencies outside the user's hearing range (e.g., ultrasonic frequencies). In such an exemplary scenario, the television may comprise acoustic emitters embedded in the television screen and/or the television screen border. Also, in such an exemplary scenario, the television controller (or other pointing device communicatively coupled thereto) may comprise a directional audio receiver (e.g., a directional microphone) that may be utilized to receive such television emissions.

Such imperceptible emission may also, for example, be imperceptible due to emission characteristics comprising spatial characteristics that make such emission imperceptible to a user. For example, the television may emit bits and/or symbols (e.g., representing one or more bits) utilizing a signal size, shape and/or location that is imperceptible to the user.

For example, in an exemplary scenario, the television may communicate information of user-selectable objects by emitting a signal from a single picture element (pixel) or a relatively small grouping thereof (e.g., a pixel matrix), where such emission may be imperceptible to the user. In such a scenario, the sensors (e.g., of the television controller) that operate to detect and/or receive such an emitted signal may be tuned to look for such single-pixel signals. In another example, a group of pixels (e.g., a contiguous group and/or a non-contiguous group) may be utilized to convey information of selectable objects.

In another exemplary scenario, the television may utilize a pixel-shifting technique (e.g., sequencing through pixels in a known, for example pseudo-random, order). Utilizing such a technique may decrease the probability that a user may detect a particular pixel being utilized to emit a signal associated with an object. For example, such a technique may comprise utilizing pseudo-random pixel sequencing so that such emissions would generally appear as random noise. In such a scenario, the television and television controller might share pseudo random code and/or random number generator seed information to enable the television controller to decode such coding.

As mentioned above, in a scenario in which both visible and/or invisible light is utilized to communicate information regarding selectable objects, such visible and invisible light may emitted at different energy (or power) levels. Various power levels may also be utilized to communicate information regarding selectable objects using visible light. For example, minor variations in color and/or brightness (e.g., variations of a magnitude too small to be perceived by a user) may be utilized to communicate selectable object information. In such a scenario, the television controller may comprise sensors capable of detecting such variations, where such variations are not perceptible to the user.

Though the above discussion mentions various types of emissions that may be received from a television to communicate information of user-selectable objects in television programming, such exemplary types of emissions are merely exemplary and non-limiting. Also, for example, such different emission types may also be combined. For example, a system implementing various aspects of the present invention may utilize television emissions that have any combination of: frequency characteristics, temporal characteristics, spatial characteristics and/or intensity characteristics, any or all of which are imperceptible to the user.

As discussed above, a television may emit any of a variety of different types of emissions (or signals) to communicate information about user-selectable objects in television programming. Such emissions may be utilized to communicate any of a variety of different types and/or formats of information, non-limiting examples of which will now be provided.

The television emissions may, for example, communicate information (e.g., bits, N-bit symbols, graphical representations of information, etc.) in serial and/or in parallel. For example, a television emission may communicate a single serial information stream. Also for example, a television emission may communicate a plurality of signals in parallel (e.g., a plurality of serial information streams, a plurality of parallel information channels, a plurality of serial streams with each communicating a portion of a symbol, etc.). Though the present discussion will generally include discussion of digital data, analog information transmission may be utilized at well.

The television emissions may communicate general data information. Such data may, for example, be raw non-coded data or may be coded data. In an exemplary scenario communicating coded data with the television emissions, any of a variety of different types of coding may be utilized to communicate such data. The potentially massively parallel nature of television emissions (e.g., from pixels and/or embedded antennas or other emitters) provides great flexibility in the manner in which data concerning user-selectable objects may be communicated from a television to another device (e.g., to a television controller).

For example and without limitation, such data may be communicated utilizing time coding, space coding, pseudo-random coding, frequency coding, etc. For example, data may be coded in any manner typically utilized for data stream coding. Also for example, data may be coded in a spatial manner (e.g., where screen location relative to a reference point is indicative of data). Further for example, data may be coded in accordance with a spatial pattern on the television screen at a single instant in time or over a single time period. Still further for example, data may be coded in accordance with a time-varying pattern communicated over a period of time (e.g., where a time sequence of emissions from respective screen locations represents particular data).

Also for example, data may be graphically coded (e.g., with different graphical images representing different data). Non-limiting examples of such graphical coding may comprise bar coding, matrix coding (e.g., utilizing a one-dimensional and/or two-dimensional matrix of pixels, or groups thereof, to represent data), etc. Also for example, data may be graphically coded utilizing graphical representations of symbol constellations (e.g., phase and/or amplitude constellations).

The television emissions may also communicate information about the user-selectable object other than data. For example and without limitation, such television emissions may communicate an outline of the user-selectable object. For example, in such a scenario, the television controller may receive and analyze such outline, while such outline is imperceptible to the user. Also for example, in such a scenario, the graphical object outline may also be utilized to communicate data (e.g., identify information, function information, etc.) concerning such user-selectable object. Note that such an outline of a user-selectable object may also be represented by one or more polygons or other graphical objects (e.g., as opposed to a true outline of the user-selectable object) indicative of the user-selectable object (e.g., one or more squares, circles, ovals, rectangles, etc.).

In yet another example, such graphical features emitted by the television may be associated with textual images (e.g., any of a variety of textual fonts). For example, the television may directly communicate text images that may be received by another device (e.g., by a television controller pointed at the location of the screen emitting such textual images). Such text may, for example, be associated with a particular user-selectable object, and may be emitted from the television from a screen location coinciding with the location of the user-selectable object. Such text may, for example, represent an object's name, unique universal and/or program-centric identification code, etc.

For example, in a sporting event scenario, the name of each player may be graphically communicated by the television, where such name is attached to the player. In such a scenario, when a user desires to know a player's name, the user may point a television controller at the player, and the television controller can then receive, process and present the name (or cause the name to be presented) to the user in a perceivable form. Note that such textual images may be communicated in a serial and/or parallel manner.

The previous discussion generally addressed types of emissions that may be emitted by a television, where such emissions may be received and processed by a television controller or other device. Such emissions may communicate any of a variety of different types of information. For example, such information may comprise object identification information and may also comprise any of a variety of different types of information associated with the user-selectable object. As non-limiting examples, such information may comprise information describing the user-selectable object. Such descriptive information may, for example, include history information, make/model information, relationship information, advertising information, statistics, contact information, information regarding additional sources of information concerning the object, etc.

Such information may also comprise user interface information describing a user interface by which the user may obtain additional information regarding the object. For example, such information may comprise information concerning one or more actions associated with the user-selectable object that are available to the user (e.g., purchase actions or other business transactions, requests for additional information, user review actions, web log access for blogs concerning such object, fan club information, distributor and/or retailer information, order information, search engine access for additional information concerning the object, email actions for forwarding information regarding a user-selected object to others, etc.).

As discussed above, step 240 may comprise receiving any or all of the above-mentioned types of television emissions communicating any or all of the above-mentioned information communicated in any or all of the above-mentioned manners. After receiving such television emissions, step 240 may comprise analyzing such emissions to determine the identity and/or other actions associated with the user-selected object.

For example, step 240 may comprise processing the received television emissions to identify the user-selected object. As mentioned above, information identifying the user-selected object may be emitted by the television in any of variety of manners. Step 240 may comprise processing the received television emissions in the respective manner appropriate for the particular type of emission.

For example, in an exemplary scenario where object identification information (or other information) is emitted by the television in a coded (and/or modulated) format, step 240 may comprise decoding (and/or demodulating) the received emission (and/or information communicated thereby) in the manner appropriate for reversing the type of coding (and/or modulating) utilized by the television to communicate the information.

As a non-limiting example, step 240 may comprise analyzing light emissions detected by a directional light sensor and/or captured by a camera to determine the information communicated by the television emission. As another example, step 240 may comprise analyzing wireless RF emissions detected by a directional antenna.

Such analyzing may, for example, include detecting bits/symbols communicated in a serial and/or parallel data stream, analyzing a graphical image (e.g., via pattern matching) or a sequence of graphical images to determine information communicated by such graphical image(s), analyzing a time-varying pattern to determine the information communicated by such time-varying pattern, analyzing graphical text images to identify text being communicated thereby, analyzing graphical information to determine the boundaries of user-selectable objects, etc.

In additional to analyzing received television emissions to determine information communicated thereby, step 240 may comprise analyzing the received television emission to determine which of a plurality of user-selectable objects is currently being selected by the user. Step 240 may comprise performing such analysis in any of a variety of manners, non-limiting examples of which will now be presented.

For example, as discussed previously, the television emissions may coincide with the on-screen location of corresponding user selectable objects. For example, a product name may be emitted from within the boundaries of (or a point/area generally associated with) the product being presented on the television screen, an actor name may be emitted from within the boundaries of (or a point/area generally associated with) the actor being presented on the television screen, etc. In such a scenario, utilizing directional sensors (or a camera with a defined field of view), step 240 may comprise determining whether the television controller (or other pointing device) is being pointed to a particular object. For example, step 240 may comprise determining that a user is pointing to a particular user-selectable object when a television emission communicating information of such particular object is received within a particular distance (or angle) from the center of a camera's field of view, from the center of a light sensor's respective sensing window, from the center of a directional antenna gain pattern, etc. In such a scenario, step 240 may also comprise providing for adjustment of such determination criteria (e.g., providing for narrowing and/or expanding the pointing window in accordance with user preferences, in accordance with distance from the television, in accordance with camera zoom settings, in accordance with the object size and/or rate at which an object is moving on the television screen, etc.

In various operational scenarios, a plurality of user-selectable objects may be located on-screen in relatively close proximity (e.g., within a camera and/or sensor field of view, within an object selection window, etc.). In such a scenario, step 240 may comprise receiving and processing information for all of such user-selectable objects (e.g., treating all of such objects as having been selected by the user).

Alternatively, in such a scenario, step 240 may comprise identifying a most likely object being selected by the user. Step 240 may comprise identifying such most likely selected object in any of a variety of manners and based on any of a variety of considerations. For example, step 240 may comprise identifying a user-selectable object that is the closest to the user's on-screen pointing location (e.g., closest to the center of a directional sensor or antenna pattern, closest to the center of a camera field of view, etc.). Also for example, step 240 may comprise determining a most likely user-selected object based, at least in part, on respective popularity of user selectable objects (e.g., favoring the most often selected inanimate and/or animate objects). Additionally for example, step 240 may comprise identifying a most likely user-selected object based, at least in part, on monetary considerations (e.g., placing a higher likelihood on user-selectable objects associated with relatively higher paying advertisers, placing a higher likelihood on user-selectable objects associated with a per-selection based advertising fee, etc.). Further for example, step 240 may comprise identifying a most likely user-selected programming object based on history of selection from a particular user (e.g., favoring types of objects most often selected by a particular user). Also for example, step 240 may comprise identifying a most likely user-selected programming object based on object newness (e.g., a new object is likely to garner more interest than an object that has been shown for a relatively long period of time). Additionally, for example, step 240 may comprise identifying a most likely user-selected television programming object based on object size.

As discussed previously with regard to step 230, various aspects of the present invention may comprise determining on-screen pointing location. For example, such determined on-screen pointing location may be used to provide pointing feedback to a user. Such information may also, however, be utilized to enhance the object identification performed at step 240. For example, information of on-screen pointing location and on-screen object location may be processed to enhance the object identification discussed above. For example, in an exemplary scenario in which a plurality of user-selectable objects are in the field of view of a camera detecting emissions from the television, information regarding the on-screen pointing location and on-screen object location may be utilized to assist in selecting between a plurality of the user-selectable objects (e.g., in determining a user-selectable object that is closest to the on-screen pointing location).

Step 240 may also, for example, include analyzing a plurality of received emissions to enhance the accuracy of the information communicated and/or the reliability of the object selection determination. For example, step 240 may comprise processing a plurality of television emissions communicating the same data to increase the accuracy of the data detection process. Also for example, step 240 may comprise processing a plurality of television emissions when identifying a selected object to filter out user instability in pointing. Such filtering may, for example, comprise filtering over a particular period of time, over a particular number of on-screen pointing direction and/or object selection determinations, over a particular number of television programming frames, etc. In yet another exemplary scenario, step 240 may comprise performing image stabilization processing to compensate for unsteadiness of the user in pointing to a user-selected object.

In general, step 240 may comprise identifying a user-selectable object in the television programming (e.g., television programming being presented on a television controllable with the television controller) at which the user is pointing (e.g., based at least in part on emissions output by a television and received/processed by a television controller implementing the method 200). Accordingly, the scope of various aspects of the present invention should not arbitrarily be limited by any particular manner of performing such identifying unless explicitly claimed.

The exemplary method 200 may, for example at step 250, comprise providing user feedback regarding user-selected programming objects (e.g., as identified at step 240). Step 250 may comprise providing such feedback in any of a variety of manners, non-limiting examples of which will now be presented.

For example, step 250 may comprise generating a signal indicating the identity of the user-selected object (and/or various actions that the user may take regarding such user-selected object). Step 250 may then, for example, comprise communicating the generated signal to a device capable of presenting information of such identity to a user. For example, step 250 may comprise communicating the generated signal to an on-board display of the television controller. In such a scenario, the television controller may then provide information of a user-selected object to the user without interfering with the presentation of video information on the television.

Also for example, step 250 may comprise communicating the generated signal to the television (and/or a television receiver coupled thereto), where the generated signal comprises characteristics that cause the television to present information of the user-selected object on the screen of the television (e.g., superimposed on the selected object, in a screen border area, ticker bar, information bubble, etc.).

Step 250 may comprise generating signals associated with presenting any of a variety of types of information to the user regarding a user-selected object. For example and without limitation, such information may comprise graphical cursor information, highlighting the identified object on a display, a brightness variation corresponding to the selected object, a color variation corresponding to the selected object, an image distortion window (or magnification window) associated with the selected object, a target symbol or crosshairs presented on or around the selected object, etc.

For example, such a generated signal may comprise characteristics adapted to cause the television (e.g., directly and/or via a television receiver) and/or television controller to overlay a graphical feature coinciding with the identified user-selectable object on the television programming as the television programming is presented to the user. For example, as discussed above, a user-selectable object (and/or the user-selectable portion of a user-selectable object) may be defined by one or more geometric shapes. In such an exemplary scenario, step 250 may comprise generating a signal comprising characteristics adapted to cause the television to highlight such geometric shapes (or the borders thereof) when step 240 determines that the user has selected a user-selectable object associated with such geometric shapes. Also for example, step 250 may comprise generating a signal comprising characteristics adapted to cause the television to present an outline of the identified object on the television screen, temporarily brighten or alter the color of the identified object, temporarily display a message on the screen as an indication of the identified object, etc. Step 250 may also, for example, comprise outputting an audio indication that a user-selected object has been identified and/or generating a signal comprising characteristics that cause another device (e.g., a television) to output such an audio indication.

Also for example, such information presented to the user may comprise textual information (e.g., in an information window, bubble or other graphical construct) indicating the identity of the user-selected object. Such textual information may, for example, comprise information merely identifying the object and may also include information discussing other aspects of the object, some of which were discussed previously.

Further for example, step 250 may comprise providing a graphical user interface enabling the user to take any of a variety of available actions regarding the user-selected object (e.g., business transactions, requests for additional information, etc.). Such graphical user interface may, for example, be provided utilizing a display of the television controller and/or a screen of the television.

In general, step 250 may comprise providing user feedback regarding user-selected objects in television programming (e.g., as identified at step 240). Accordingly, the scope of various aspects of the present invention should not be limited by characteristics of any particular type of such information or of any particular manner of providing such information unless explicitly claimed.

The exemplary method 200 may, for example at step 295, comprise performing continued operations. Step 295 may comprise performing any of a variety of continued operations, non-limiting examples of such continued operation(s) will be presented below. For example, step 295 may comprise returning execution flow to any of the previously discussed method steps. For example, step 295 may comprise returning execution flow of the exemplary method 200 to step 230 for determining additional on-screen pointing locations and user-selected objects in the television programming.

Additionally for example, step 295 may comprise communicating information indicating the identified user-selectable object to a device other than a television, television receiver and/or components of the television controller (e.g., a user device at the same premises as the television and/or television receiver and/or a device communicatively coupled to the television and/or television receiver via a communication network). For example, step 295 may comprise communicating such information to a second controller device different from the television controller implementing the method 200 (e.g., in a scenario where the second television controller device may provide the user an indication of the identified user-selectable object).

Further for example, step 295 may comprise processing information of an identified user-selected object (e.g., as determined at step 240) to determine an action to perform with regard to such selected object. Various non-limiting examples of such actions are provided in U.S. Provisional Application No. 61/242,234, which is hereby incorporated herein by reference in its entirety.

Also for example, step 295 may comprise outputting an indication of (or generating a signal causing the outputting of such an indication of) on-screen pointing location to the user. For example, as discussed previously, step 230 may comprise determining on-screen pointing location. Step 295 may comprise providing feedback to a user of where the user is pointing. Such an indication may, for example, comprise a graphical feature output on the screen of the television and/or on a display of the television controller. Such an indication may, for example, take the place of, and/or supplement, a directional sighting beam (e.g., a laser beam) emitted by the television controller or other pointing device to indicate on-screen pointing location.

In general, step 295 may comprise performing continued operations (e.g., performing additional operations corresponding to a user-selected television programming object, repeating various method steps for additional user-selected objects, etc.). Accordingly, the scope of various aspects of the present invention should not be limited by characteristics of any particular type of continued processing unless explicitly claimed.

Figure 3:
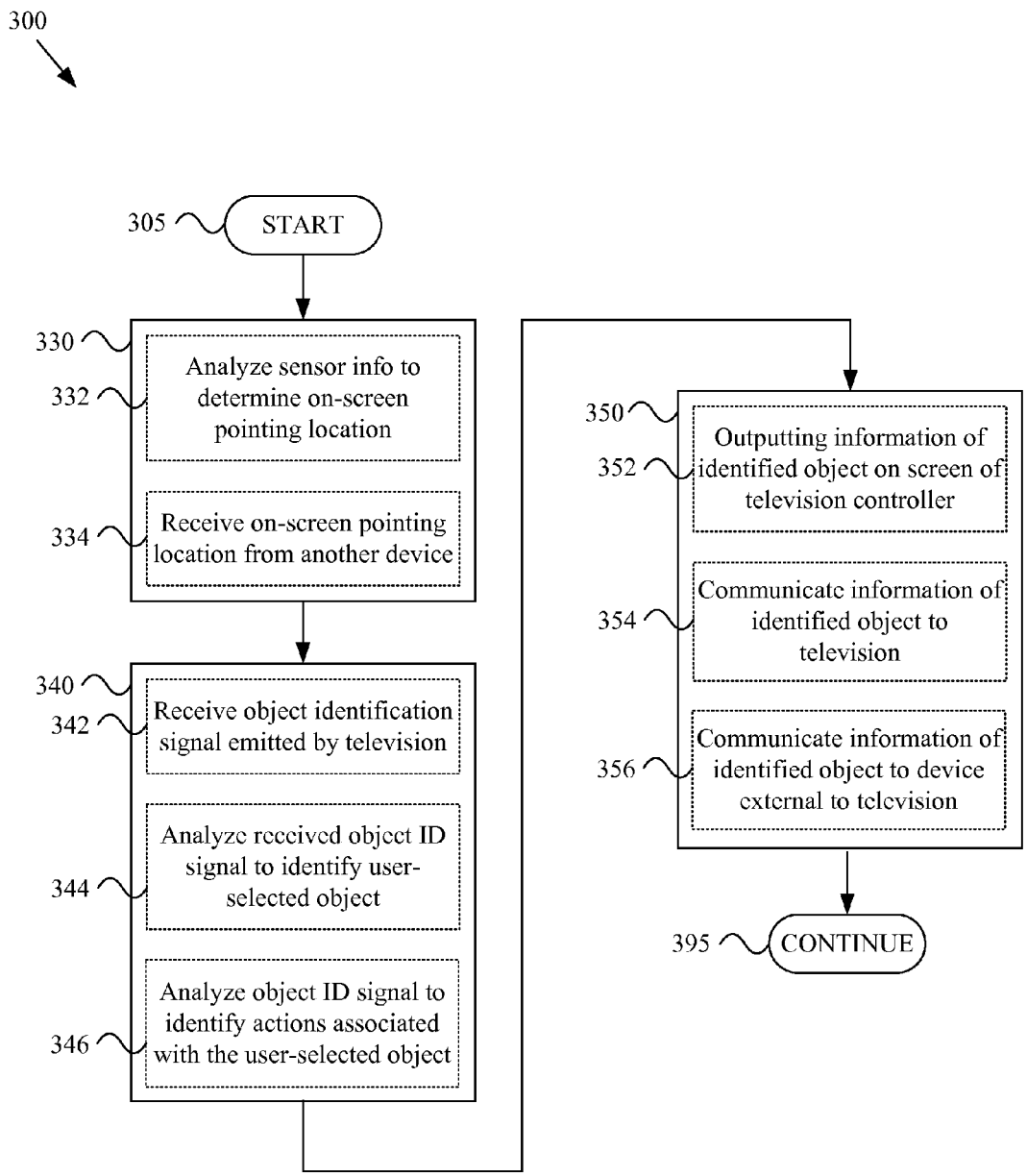
FIG. 3 is a flow diagram illustrating an exemplary method for providing user-selection of objects in television programming, in accordance with various aspects of the present invention.

Turning next to FIG. 3, such figure is a flow diagram illustrating an exemplary method 300 for providing user-selection of objects in television programming, in accordance with various aspects of the present invention. The exemplary method 300 may, for example, share any or all characteristics with the exemplary method 200 illustrated in FIG. 2 and discussed previously. Any or all aspects of the exemplary method 300 may, for example, be implemented in a television controller (e.g., external to a television), for example the first television controller 160 and/or second television controller 161 shown in FIG. 1 and discussed previously.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may, for example at step 330, comprise determining on-screen pointing location pointed to by a user of the television and/or television controller. Step 330 may, for example, share any or all characteristics with step 230 of the exemplary method 200 illustrated in FIG. 2 and discussed previously.

For example, step 330 may comprise, for example at sub-step 332, analyzing sensor information (e.g., associated with sensors on-board and/or off-board the television and/or television controller) to determine user on-screen pointing location. Alternatively for example, step 330 may comprise, for example at sub-step 334, the television controller receiving information describing the on-screen pointing location from a device external to the television controller (e.g., the television, a television receiver, a television network device, etc.).

The exemplary method 300 may, for example at step 340, comprise identifying a user-selectable object in the television programming (e.g., the television programming being presented to the user on a television controllable with the television controller) at which the user is pointing based, at least in part, on emissions output by a television and received/processed by a television controller implementing the method 300. Step 340 may, for example, share any or all characteristics with step 240 of the exemplary method 200 illustrated in FIG. 2 and discussed previously.

For example, step 340 may comprise, for example at sub-step 342, receiving one or more emissions from a television that is presenting television programming on a screen, where the emission corresponds to a user-selectable object in the television programming. Also for example, step 340 may comprise, for example at sub-step 344, analyzing a television emission (e.g., as received at sub-step 342) to identify a programming object selected by a user. Such television emission may, for example, comprise an emission from the screen area of the television that communicates object identification information. Additionally, for example, step 340 may comprise, for example at sub-step 346, analyzing a television emission (e.g., as received at sub-step 342) to identify actions associated with the user-selected object. Such actions may, for example, comprise various actions available to the user and corresponding to the identified object (e.g., business transactions, additional information actions, information searching actions, communication actions, etc.).

The exemplary method 300 may, for example at step 395, comprise performing continued operations. Step 395 may, for example, share any or all characteristics with step 295 of the exemplary method 200 illustrated in FIG. 2 and discussed previously.

Figure 4:
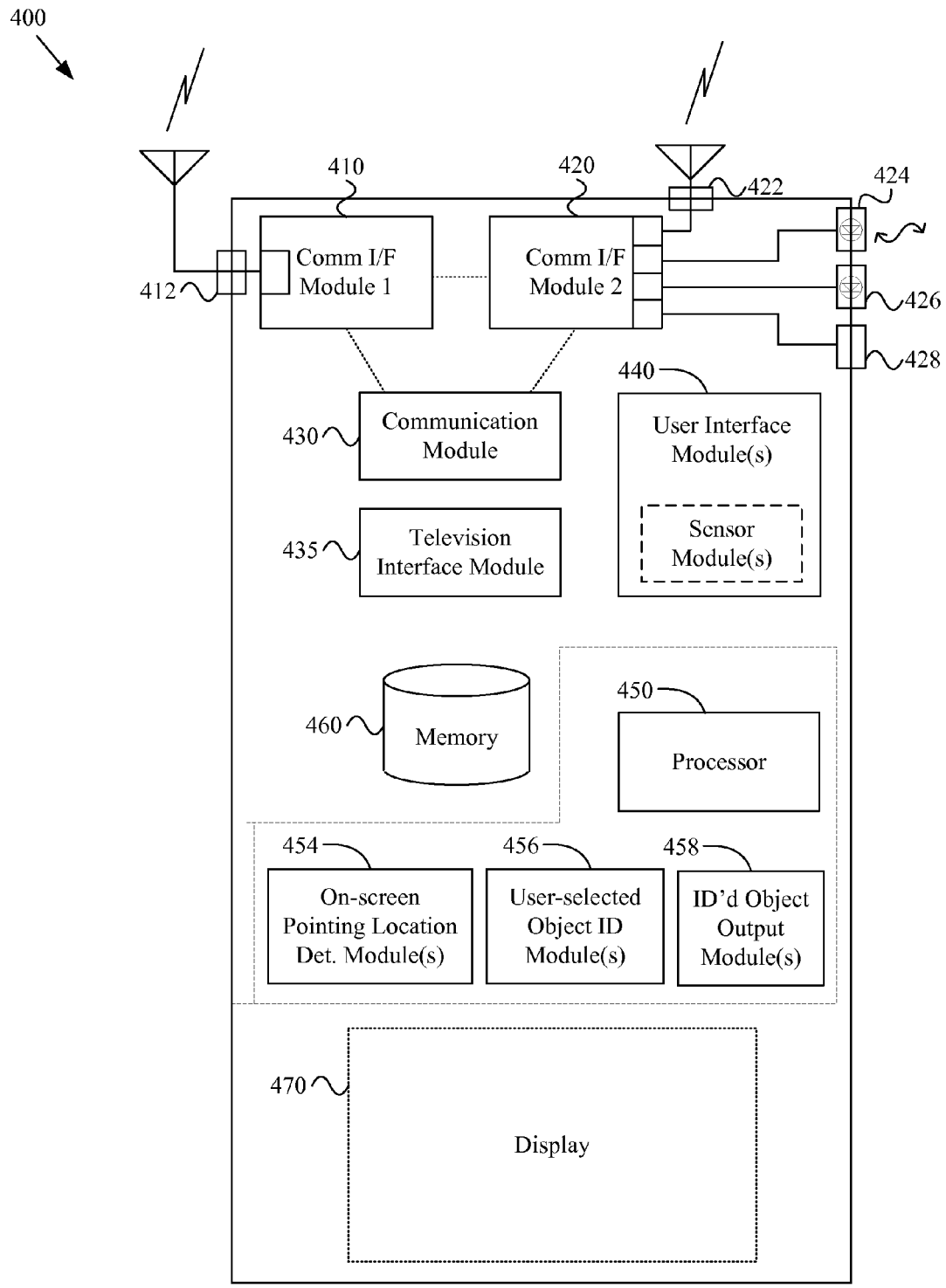
FIG. 4 is a diagram illustrating an exemplary television controller, in accordance with various aspects of the present invention.

Turning next to FIG. 4, such figure is a diagram illustrating an exemplary television controller 400, in accordance with various aspects of the present invention. The exemplary television controller 400 may, for example, share any or all characteristics with the exemplary first television controller 160 and/or second television controller 161 illustrated in FIG. 1 and discussed previously. Also, the exemplary television controller 400 (e.g., various modules thereof) may operate to perform any or all of the functionality discussed previously with regard to the exemplary methods 200 and 300 illustrated in FIGS. 2-3 and discussed previously.

The exemplary television controller 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 410 may operate to communicate with local sources of television video content (e.g., video recorders, receivers, gaming devices, etc.). Additionally, for example, the first communication interface module 410 may operate to communicate with a local television, a local television receiver, a local and/or remote television program storage system, another television controller (e.g., directly or via one or more intermediate communication networks), etc.

The exemplary television controller 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication interface module 420 may operate to communicate with local sources of television video content (e.g., video recorders, receivers, gaming devices, etc.). Additionally, for example, the second communication interface module 420 may operate to communicate with a local television, a local television receiver, a local and/or remote television program storage system, another television controller (e.g., directly or via one or more intermediate communication networks), etc.

The exemplary television controller 400 may also comprise additional communication interface modules, which are not illustrated. Such additional communication interface modules may, for example, share any or all aspects with the first 410 and second 420 communication interface modules discussed above.

The exemplary television controller 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television controller 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television controller 400 may additionally comprise one or more user interface modules 440. The user interface module(s) 440 may generally operate to provide user interface functionality to a user of the television controller 400. For example, and without limitation, the user interface module 440 may operate to provide for user control of any or all standard television controller commands (e.g., television and/or TV receiver channel control, on/off, input selection, programming, recording/playback control, etc.). The user interface module 440 may, for example, operate and/or respond to user commands utilizing user interface features disposed on the television controller 400 (e.g., buttons, etc.) and may also utilize the communication module 430 (and/or first 410 and second 420 communication interface modules) to communicate with another television controller (e.g., a dedicated television remote control, a universal remote control, a cellular telephone, personal computing device, gaming controller, etc.), a peripheral of the television controller 400, etc. Further for example, the user interface module(s) 440 may utilize the communication module 430 (and/or first 410 and/or second 420 communication interface modules) to communicate with a television, television receiver, programming storage device, remote television programming source, etc., to utilize the user interface features of such device.

The user interface module 440 may also comprise one or more sensor modules that operate to interface with and/or control operation of any of a variety of sensors that may be utilized to ascertain an on-screen pointing location and/or object identification. For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module 440 (or sensor module(s) thereof) may operate to control the transmission of signals (e.g., RF signals, optical signals, acoustic signals, etc.) from such sensors.

As discussed above with regard to at least the methods 200 and 300 illustrated in FIGS. 2 and 3, the television controller 400 (or various modules thereof) may operate to receive and process television emissions (e.g., light emissions, wireless RF emissions, audio emissions, etc.). Such receipt may, for example, be effected through the utilization of a camera onboard the television controller 400, a directional antenna, one or more light sensors, etc. In such an exemplary scenario, the sensor modules of the user interface modules 440 may comprise such camera(s) and/or sensor(s). Alternatively for example, the communication interface modules 410, 420 may also be utilized for the receipt of such television emissions.

Additionally, the user interface module 440 may perform any of a variety of audio and/or video output functions (e.g., in an exemplary scenario where the television controller 400 has an onboard display and/or speaker, in an exemplary scenario where the television controller 400 is utilizing a display and/or speaker of another device, etc.). Also, for example, in a scenario in which the television controller 400 has incorporated therein a pointing direction indicator (e.g., a laser pointer, etc.), the user interface module 400 may operate to control operation of such pointer.

The exemplary television controller 400 may comprise one or more processors 450. The processor 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed by a processor executing instructions. For example, though various modules are illustrated as separate blocks or modules in FIG. 4, such illustrative modules, or a portion thereof, may be implemented by the processor 450.

The exemplary television controller 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

The exemplary television controller 400 may comprise one or more modules that operate to perform and/or manage the receipt and/or communication of television programming. For example, such one or more modules may operate to utilize the communication module 430 (e.g., and at least one of the communication interface modules 410, 420) to receive and/or communicate television programming. Also for example, such one or more modules may operate to utilize the communication module 430 (and/or first 410 and/or second 420 communication interface modules) to communicate television programming and/or other video output information to a television for presentation to a user. Additionally for example, such one or more modules may operate to utilize the communication module 430 (e.g., and at least one of the communication interface modules 410, 420) to communicate television programming or other video output information to one or more devices communicatively coupled to the television controller 400 (e.g., devices other than a television).

The exemplary television controller 400 may comprise one or more on-screen pointing location determination module(s) 454. Such on-screen pointing location determination module(s) 454 may, for example, operate to determine an on-screen pointing location pointed to by a user of the television controller and/or a television (or television receiver) communicatively coupled thereto. Such module(s) 454 may, for example, operate to perform step 230 of the exemplary method 200 and/or step 330 of the exemplary method 300 discussed previously. For example, the module(s) 454 may operate to analyze sensor information to determine an on-screen pointing location. Also for example, the module(s) 454 may operate to receive on-screen pointing location information from a device (e.g., a television, a television receiver, a television network device, a user pointing device, etc.) external to the television controller 400 (e.g., utilizing the communication module 430).

The exemplary television controller 400 may comprise one or more user-selected object identification modules 456. Such module(s) 456 may, for example, operate to identify a user-selectable object in television programming at which a user of the television controller 400 and/or a television (or television receiver) communicatively coupled thereto is pointing. For example, such module(s) 456 may operate to identify such user-selected object based, at least in part, on emissions from the television (e.g., from the screen area of the television). Such emissions may include for example, as discussed previously, light emissions, wireless RF emissions, audio emissions, etc. The module(s) 456 may, for example, operate to perform step 240 of the exemplary method 200 and/or step 340 of the exemplary method 300 discussed previously.

As discussed previously, various aspects of the present invention may comprise generating one or more signals indicating the identity of the user-selected object, other related information, information regarding various actions that the user may take regarding such user-selected object, etc. The television controller 400 may, for example, comprise an identified object output module 458 that operates to perform such functionality. The module(s) 458 may, for example, operate to perform step 250 of the exemplary method 200 and/or step 350 of the exemplary method 300 discussed previously.

For example, in an exemplary scenario where such information of a user-selected object is output on a screen of the television controller 400, the module(s) 458 may operate to communicate such generated one or more signals to the user interface module(s) 440. Also for example, in an exemplary scenario where such information of a user-selected object is to be output on the screen of the television, the module(s) 458 may operate to utilize the communication module 430 to communicate such generated one or more signals to the television (or television receiver). Similarly, in a scenario in which screen pointing information is to be provided to the user (e.g., as feedback to the user indicating where the user is pointing), the module(s) 458 may generate one or more signals indicative of such feedback and communicate such generated signal(s) to the user interface module(s) 440 and/or the communication module 430, depending on the destination for such signal(s).

Though not illustrated, the exemplary television controller 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 452, 454 and 456) may be performed by the processor(s) 450 executing instructions stored in the memory 460.

Figure 5:
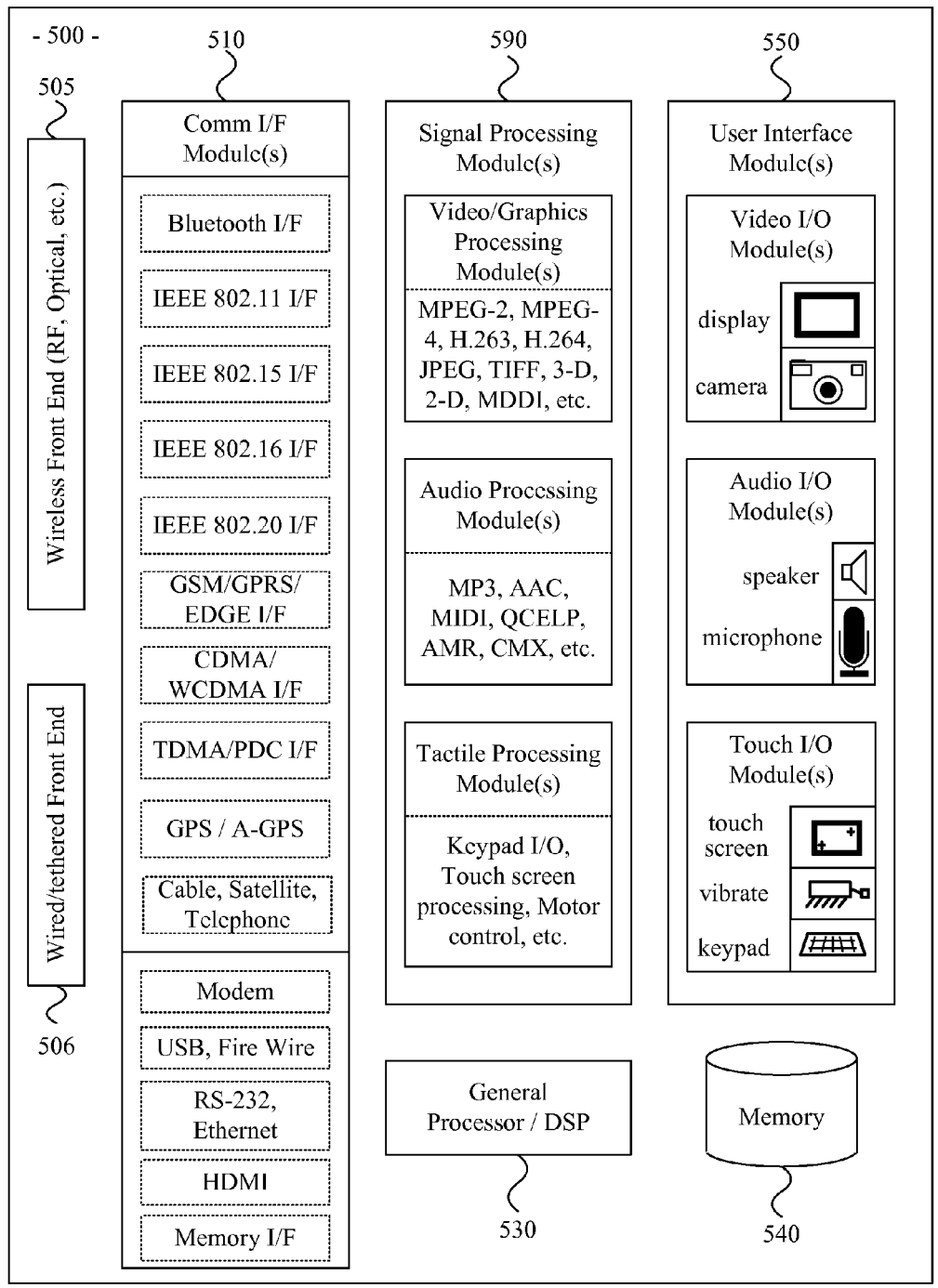
FIG. 5 is a diagram illustrating exemplary modules and/or sub-modules for a television controller, in accordance with various aspects of the present invention.

Turning next to FIG. 5, such figure is a diagram illustrating exemplary modules and/or sub-modules for a television controller 500, in accordance with various aspects of the present invention. The exemplary television controller 500 may share any or all aspects with any of the television controllers 160, 161 and 400 discussed herein and illustrated in FIGS. 1 and 4. For example, the exemplary television controller 500 (or various modules thereof) may operate to perform any or all functionality discussed herein with regard to the exemplary method 200 illustrated in FIG. 2 and the exemplary method 300 illustrated in FIG. 3. As with the exemplary television controller 400, the components of the exemplary television controller 500 may be disposed in a single television controller (e.g., a dedicated television control device, a universal remote control, a cellular telephone or personal computing device with television control capability, any personal electronic device with television control capability, etc.).

For example, the television controller 500 comprises at least one processor 530. Such processor(s) 530 may, for example, share any or all characteristics with the processor(s) 450 discussed with regard to FIG. 4. Also for example, the television controller 500 comprises one or more memories 540. Such one or more memories 540 may, for example, share any or all characteristics with the one or more memories 460 discussed with regard to FIG. 4.

Also for example, the television controller 500 may comprise any of a variety of user interface module(s) 550. Such user interface module(s) 550 may, for example, share any or all characteristics with the user interface module(s) 440 discussed previously with regard to FIG. 4. For example and without limitation, the user interface module(s) 550 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television controller 500 may also, for example, comprise any of a variety of communication modules (505, 506, and 510). Such communication module(s) may, for example, share any or all characteristics with the communication interface module(s) 410, 420 discussed previously with regard to FIG. 4. For example and without limitation, the communication interface module(s) 510 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television controller 500 is also illustrated as comprising various wired 506 and/or wireless 505 front-end modules that may, for example, be included in the communication interface modules and/or utilized thereby.

The exemplary television controller 500 may also comprise any of a variety of signal processing module(s) 590. Such signal processing module(s) 590 may share any or all characteristics with modules of the exemplary television controller 400 that perform signal processing. Such signal processing module(s) 590 may, for example, be utilized to assist in processing various types of information discussed previously (e.g., with regard to sensor processing, position determination, video processing, image processing, audio processing, general user interface information data processing, etc.). For example and without limitation, the signal processing module(s) 590 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., keypad I/O, touch screen processing, motor control, etc.).

In summary, various aspects of the present invention provide a system and method in a television controller (e.g., a device with television remote control capability) for providing user-selection of objects in a television program. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for identifying a user-selected object in television programming, the method comprising:
in a television controller:
receiving an emission from a television that is presenting television programming on a screen, wherein the emission corresponds to a user-selectable object being displayed in the television programming, the emission being emitted from the screen of the television and imperceptible to a user;
determining an on-screen pointing location pointed to by a user of the television controller and generating a signal indicating the determined on-screen pointing location;
analyzing the received emission and the on-screen pointing location to determine the identity of the user-selectable object; and
performing one or more actions in response to the identity of the user-selectable object.

2. The method of claim 1, wherein the emission is imperceptible due to emission characteristics comprising temporal characteristics.

3. The method of claim 1, wherein the emission is imperceptible due to emission characteristics comprising frequency characteristics.

4. The method of claim 3, wherein the emission is a light emission at a light frequency that is imperceptible to a user.

5. The method of claim 1, wherein the emission is imperceptible due to emission characteristics comprising spatial characteristics.

6. The method of claim 1, wherein the emission communicates information concerning one or more actions, associated with the user-selectable object, that are available to a user.

7. The method of claim 1, wherein the emission communicates textual information associated with the user-selectable object.

8. The method of claim 1, wherein the emission communicates a coded pattern associated with the user-selectable object.

9. The method of claim 1, wherein the emission communicates one or more graphical features associated with the sources of information.

10. The method of claim 1, wherein the generated signal is adapted to cause the television to output information of the identified user-selectable object on a screen of the television.

11. The method according to claim 1, wherein receiving the emission from a television is in response to the on-screen pointing location pointed to by the user.

12. The method according to claim 1, wherein the emission is from a location on the screen where the user-selectable object is positioned.

13. The method according to claim 1, wherein the emission communicates information comprising a serial information stream regarding the user selectable object.

14. The method according to claim 1, wherein the emission comprises information describing the user-selectable object including at least one of history information, make/model information, advertising information, and contact information.

15. A television controller, the television controller comprising:
at least one processor and sensor operable to, at least:
receive an emission from a television that is presenting television programming on a screen, wherein the emission is imperceptible to the user and the emission is received from the screen and corresponds to a user-selectable object being displayed in the television programming;
determining an on-screen pointing location pointed to by a user of the television controller and generating a signal indicating the determined on-screen pointing location; and
analyze the received emission and the on screen pointing location to generate the at least one link on a screen of the television controller.

16. The television controller of claim 15, wherein the emission is imperceptible due to emission characteristics comprising temporal characteristics.

17. The television controller of claim 15, wherein the emission is imperceptible due to emission characteristics comprising frequency characteristics.

18. The television controller of claim 17, wherein the emission is a light emission at a light frequency that is imperceptible to a user.

19. The television controller of claim 17, wherein the emission is a radio frequency emission.

20. The television controller of claim 15, wherein the emission communicates information identifying the user-selectable object.

21. The television controller of claim 15, wherein the emission communicates information concerning one or more actions, associated with the user-selectable object, that are available to a user.

22. The television controller of claim 15, wherein the emission communicates a coded pattern associated with the user-selectable object.

23. The television controller of claim 15, wherein the emission communicates one or more graphical features associated with the user-selectable object.

24. The television controller of claim 15, wherein the generated signal is adapted to cause the television to output information of the identified user-selectable object on a screen of the television.

25. The television controller of claim 15, wherein the generated signal is adapted to cause the television controller to output information of the identified user-selectable object on a display of the television controller.

26. A method for identifying a user-selected object in television programming, the method comprising:
in a television controller:
receiving an emission from a screen of a television that is presenting television programming on the screen, where the emission is imperceptible to the user and the emission communicates information identifying a user-selectable object being displayed in the television programming;
determining an on-screen pointing location pointed to by a user of the television controller and generating a signal indicating the determined on-screen location;
analyzing the received emission and the on-screen pointing location to determine the identity of the user-selectable object; and
displaying information related to the user-selectable object based on the identity.

27. The method according to claim 26, wherein the user-selectable object comprises a timestamp in a video stream of the television programming.

28. The method according to claim 27, wherein the timestamp is operable to temporally identify the user selectable object, the user selectable object comprising a transient object displayed in the television programming.

\* \* \* \* \*